Figure 1:
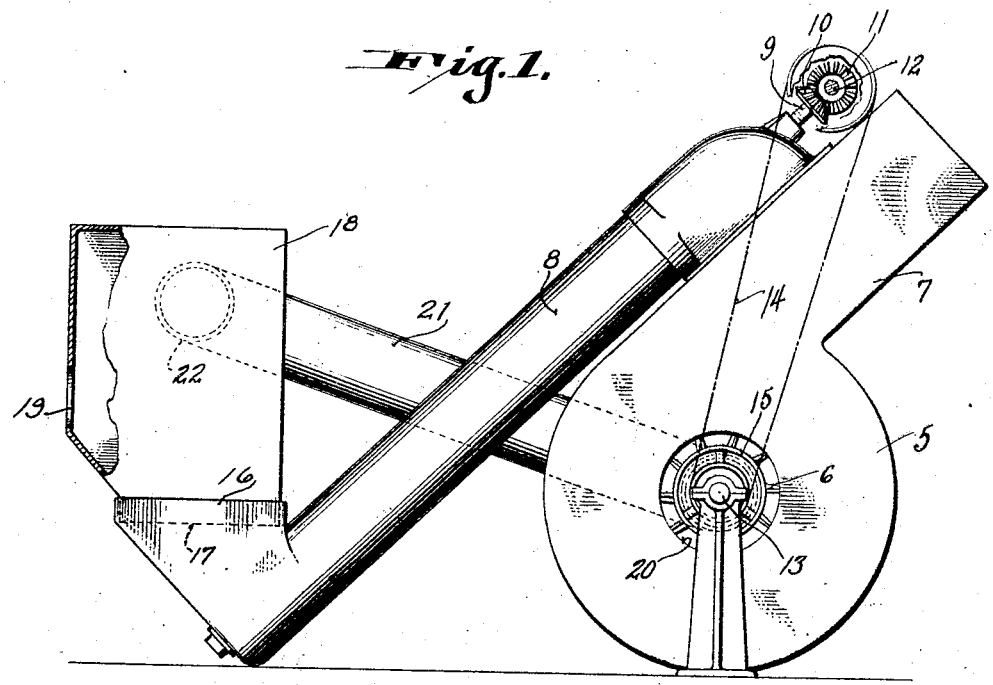

June 9, 1925.

G. BERNERT ET AL 1,541,469

PNEUMATIC CONVEYER

Filed June 3, 1921

INVENTORS
George Bernert.
Jacob Bernert.

BY

Ira M. Jones.
ATTORNEY.

Patented June 3, 1925.

1,541,469

UNITED STATES PATENT OFFICE.

GEORGE BERNERT AND JACOB BERNERT, OF MILWAUKEE, WISCONSIN.

PNEUMATIC CONVEYER.

Application filed June 3, 1921. Serial No. 474,746.

*To all whom it may concern:*

Be it known that we, GEORGE BERNERT and JACOB BERNERT, both citizens of the United States, and residents of Milwaukee, in the county of Milwaukee and State of Wisconsin, have invented new and useful Improvements in Pneumatic Conveyers; and we do hereby declare that the following is a full, clear, and exact description thereof.

This invention relates to certain new and useful improvements in pneumatic conveyers of that type employed in loading grain or other material into elevators, cars and the like.

In the present type of pneumatic conveyer a considerable amount of dust and other lighter particles are raised when the materials are discharged into the hopper for conveyance to the conveying air duct. Furthermore, there is at all times some back pressure in the hopper and conveyer casing leading therefrom which interferes with the feeding therethrough of the materials. This back pressure also adds to the dust raised in the hopper and serves to circulate the same through the atmosphere surrounding the machine making it highly objectionable.

Hence with the above and other objections to pneumatic conveyers of the type now generally employed in mind, it is one object of this invention to provide means communicating with the material for the air duct which will overcome the back pressure therein and prevent the circulation of the dust, due to such pressure and to the discharging of a fresh supply of materials therein.

It is another object of this invention to connect a pipe with an inlet of the pneumatic conveyer blower fan, which pipe has its other end connected with the material supply means, to overcome back pressure therein and carry off dust created to prevent its circulation through the surrounding atmosphere.

A further object of the present invention is to provide a pneumatic conveyer of the class described in which the supply hopper is connected with the main conveyer air duct and has an enclosed casing communicating therewith and provided with an opening through which the material is supplied, the upper part of the casing being connected with a suction means to overcome back pressure therein and carry off all dust that may tend to circulate therefrom.

A still further object of this invention is to provide a device of the class described which will not materially increase the cost of the machines and which will perform its function in a highly satisfactory manner.

With the above and other objects in view which will appear as the description proceeds, our invention resides in the novel construction, combination and arrangement of parts substantially as hereinafter described and more particularly defined by the appended claims, it being understood that such changes in the precise embodiment of the hereindisclosed invention may be made as came within the scope of the claims.

In the accompanying drawing, we have illustrated one complete example of the physical embodiment of our invention constructed according to the best mode we have so far devised for the practical application of the principles thereof, and in which:—

Figure 2:
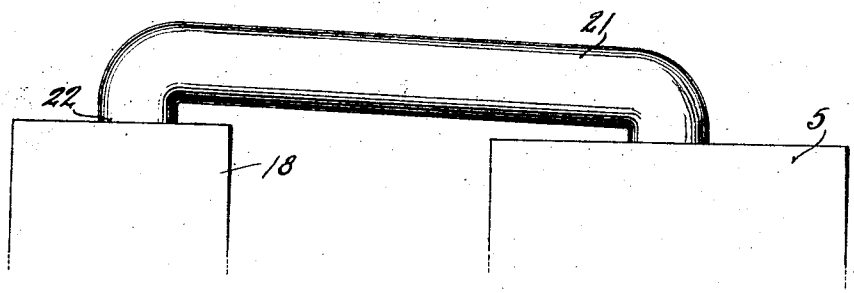

Figure 1 is a side view of a pneumatic conveyer embodying our invention, part thereof being broken away and in section, and Figure 2 is a fragmentary top plan view illustrating the manner of connecting the material supply means with a suction means.

Referring now more particularly to the accompanying drawing in which like numerals designate like parts throughout the several views, it will be seen that the improved conveyer comprises in its general organization a fan casing 5 having a fan or blower 6 therein, a trunk 7 being in communication with the casing 5. The trunk 7 is provided with an opening (not shown) with which a conveyer casing 8 is connected, the casing having suitable conveying means mounted therein (not shown) which are driven from a shaft 9 having a gear 10 fixed thereto and in mesh with a gear 11 mounted on a shaft 12 driven from the fan shaft 13 by a suitable chain or belt connection 14. The shaft 13 has a pulley 15 mounted thereon which is connected with a suitable source of power (not shown).

The lower or receiving end of the conveyer casing 8 is provided with a hopper 16 into which fits the lower end 17 of a casing 18 preferably having a side opening 19 through which the materials, to be fed to the trunk, or air duct 7, are discharged. Under normal conditions there is at all times a back pressure within the conveyer casing 8 due to its connection with the air duct 7 and consequently there is some interference with the proper conveying of materials therethrough. Furthermore, when the materials are discharged into the hopper 16, a dust is given off which circulates through the surrounding atmosphere and is highly objectionable. This dust is aggravated by the back pressure and therefore we have provided means for overcoming the back pressure and to prevent circulation of the dust given off from the materials.

The fan casing 5 is preferably provided with two alined central openings 20, concentric with the shaft 13 which form the inlet for the air propelled through the duct 7 by the fan or blower 6. One of the openings 20 has a pipe 21 connected therewith which leads to the hopper casing 18 and is connected with the interior thereof at a point 22 near the top thereof whereby a suction will be maintained within the casing 18 at all times to overcome the back pressure therein and to insure the carrying off of all dust and lighter particles stirred up in the material supply.

It will be readily apparent that if desired, all of the air supplied to the blower may be drawn through the pipe 21, or else through the pipe 21 and a second opening 20. The dust or lighter particles given off by the materials due to their being discharged into the hopper or due to the effect of the back pressure thereon are conveyed from the casing 18 through the pipe 21 into the fan casing 5 from whence they are impelled with the air through the duct 7 to be again commingled with the materials discharged into the duct by the material supply.

From the foregoing description taken in connection with the accompanying drawings, it will be readily apparent to those skilled in the art to which an invention of this character appertains, that the objectionable effect of the back pressure in the material supply is overcome, the annoyance of having the dust circulated about the machine is relieved and in general the efficiency of the machine is materially increased. It will also be appreciated that the present invention may be applied either to pneumatic conveyers at the time of their manufacture or to the conveyers now in use.

What is claimed:

1. A pneumatic conveyer, comprising, in combination, a fan casing, a conveying duct extended from the fan casing, a blower fan in the casing for procuring a pressure of conveying current of air in the duct, air inlet means for the fan casing, an elongated conveyer casing having a discharge and a receiving point, means connecting the conveyer casing discharge point with the conveying duct ahead of the fan, mechanical conveying mechanism within the conveyer casing and adapted to convey material entering the conveyer casing at its receiving point through the casing to the conveying duct to be therethrough conveyed by the conveying current of air, and means connecting the inlet means of the fan casing with the interior of the conveyer casing, whereby any back pressure in the conveyer casing incidental to its connection with the conveying duct is relieved and carried off through the blower fan.

2. In a pneumatic conveyer, a conveying duct, a blower fan connected with the duct for procuring a pressure of conveying current of air therein, a plurality of air inlets for the blower fan, a conveyer casing independent of the blower fan and having its discharge end connected with the duct at a point outwardly of the blower fan, a material supply hopper communicating with the receiving end of the conveyer casing, means within said casing for conveying material from the hopper and discharging the same into the conveying duct to be therein conveyed by the conveying current of air, and a duct connecting one of the blower fan air inlets with the interior of the hopper, whereby any back pressure in the hopper, incidental to its connection with the conveying duct through the conveyer casing, is relieved and carried off through the blower fan.

3. A pneumatic conveyer, comprising, in combination, a fan casing, a conveying duct extended from the fan casing, a blower fan in the casing for procuring a pressure of conveying current of air in the duct, air inlet means for the fan casing, an elongated conveyer casing having a discharge and a receiving point, means connecting the conveyer casing discharge point with the conveying duct ahead of the fan, mechanical conveying mechanism within the conveyer casing and adapted to convey material entering the conveyer casing at its receiving point through the casing to the conveying duct to be therethrough conveyed by the conveying current of air, a receiving hopper connected with the receiving end of the conveyer duct and into which material to be conveyed through the conveying duct is discharged, the material from the hopper entering the conveyer casing and therethrough conveyed and discharged into the conveying duct, and means connecting the inlet means of the fan casing with the interior of the hopper, whereby dust agitated by discharging material into the hopper and any back pressure in the conveyer casing incidental to its connection with the conveying duct is relieved and carried off through the blower fan.

In testimony that we claim the foregoing we have hereunto set our hands at Milwaukee, in the county of Milwaukee and State of Wisconsin.

GEORGE BERNERT.
JACOB BERNERT.